(12) United States Patent
Metten et al.

(10) Patent No.: US 10,773,782 B2
(45) Date of Patent: Sep. 15, 2020

(54) INTERIOR COMPONENT CARRIER SYSTEM AND METHOD FOR MOUNTING AN INTERIOR COMPONENT CARRIER SYSTEM

(71) Applicant: Airbus Operations GmbH, Hamburg (DE)

(72) Inventors: Martin Metten, Hamburg (DE); Hermann Benthien, Hamburg (DE); Marcus Hinrichs, Hamburg (DE); Michael Telkamp, Hamburg (DE); Florian Mueller, Hamburg (DE); Tancredi Tincani, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 480 days.

(21) Appl. No.: 15/639,854

(22) Filed: Jun. 30, 2017

(65) Prior Publication Data
US 2018/0009520 A1    Jan. 11, 2018

(30) Foreign Application Priority Data

Jul. 5, 2016 (EP) .................................... 16178035

(51) Int. Cl.
| | |
|---|---|
| B64D 11/00 | (2006.01) |
| B64C 1/06 | (2006.01) |
| B64F 5/00 | (2017.01) |

(52) U.S. Cl.
CPC .................. B64C 1/06 (2013.01); B64F 5/00 (2013.01); *B64C 1/066* (2013.01); *B64D 11/003* (2013.01); *B64D 2011/0046* (2013.01)

(58) Field of Classification Search
CPC ...................... B64D 11/003; B64D 2011/0046
See application file for complete search history.

(56) References Cited

U.S. PATENT DOCUMENTS 5,842,668 A * 12/1998 Spencer ............... B64D 11/003
244/118.1
5,984,254 A 11/1999 Baloche et al.
(Continued)

FOREIGN PATENT DOCUMENTS

| DE | 102009023393 | 12/2010 |
|---|---|---|
| EP | 2435310 | 4/2012 |

(Continued)

OTHER PUBLICATIONS

European Search Report, Dec. 13, 2016 priority document.
European Examination Report for corresponding European Patent Application No. 16173150.0.

*Primary Examiner* — Brian M O'Hara
(74) *Attorney, Agent, or Firm* — Greer, Burns & Crain, Ltd.

(57) ABSTRACT

An interior component carrier system comprises a first and second installation rail. Each rail includes at least one connecting portion connectable to an associated primary structure component to fasten the rail to the component, and a carrier portion extending from the connecting portion in a direction along a longitudinal axis of the system. The system further comprises a first carrier element having a first end connected to a first carrier rod extending in a direction along the longitudinal axis and a second end connectable to a first interior component, wherein the first carrier rod is fastened to the carrier portion of the first rail, and a second carrier element having a first end connected to a second carrier rod extending in the longitudinal axis direction and a second end connected to the first carrier element, wherein the second carrier rod is fastened to the second rail carrier portion.

18 Claims, 12 Drawing Sheets

(56) References Cited

U.S. PATENT DOCUMENTS

| | | | |
|---|---|---|---|
| 6,883,753 B1* | 4/2005 | Scown | B64C 1/06 |
| | | | 244/118.1 |
| 9,056,685 B2 | 6/2015 | Umlauft et al. | |
| 2010/0243805 A1* | 9/2010 | Gross | B64C 1/064 |
| | | | 244/119 |
| 2012/0131779 A1 | 5/2012 | Umlauft et al. | |
| 2019/0092478 A1* | 3/2019 | Gilbert | B64D 11/0696 |

FOREIGN PATENT DOCUMENTS

| | | |
|---|---|---|
| EP | 2435311 | 4/2012 |
| GB | 2121083 | 12/1983 |
| JP | 2000025494 | 1/2000 |
| WO | 2008091233 | 7/2008 |
| WO | 2014088600 A1 | 6/2014 |

* cited by examiner

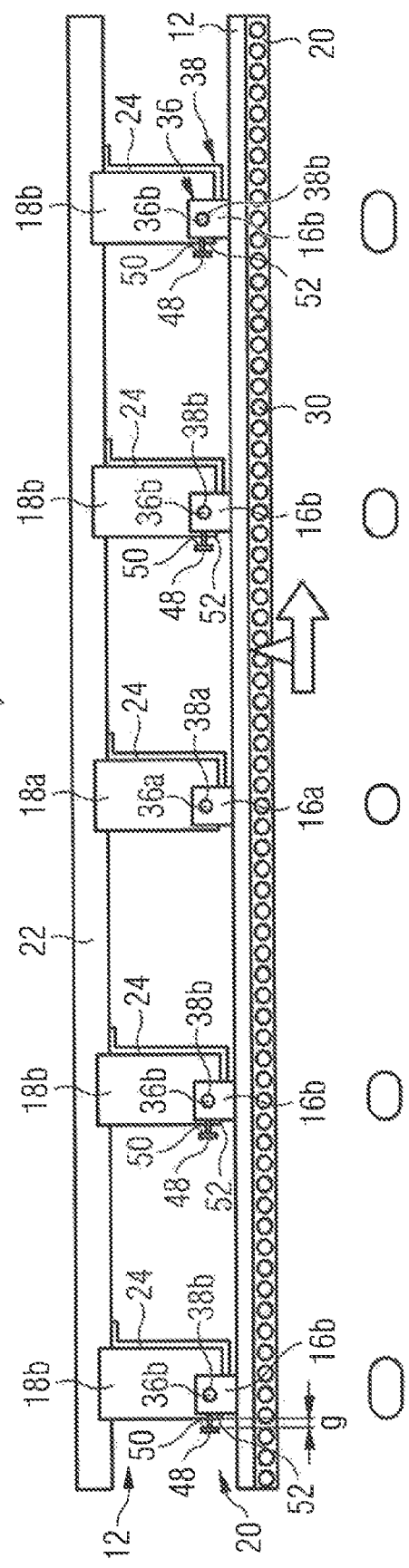

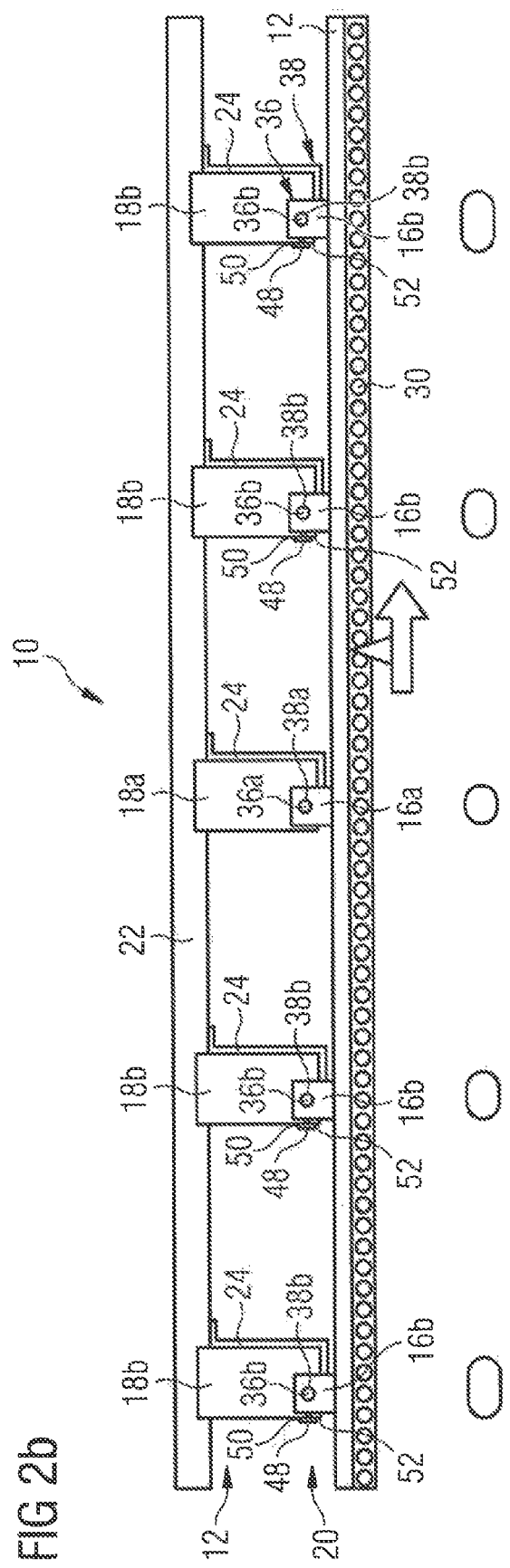

FIG 3a
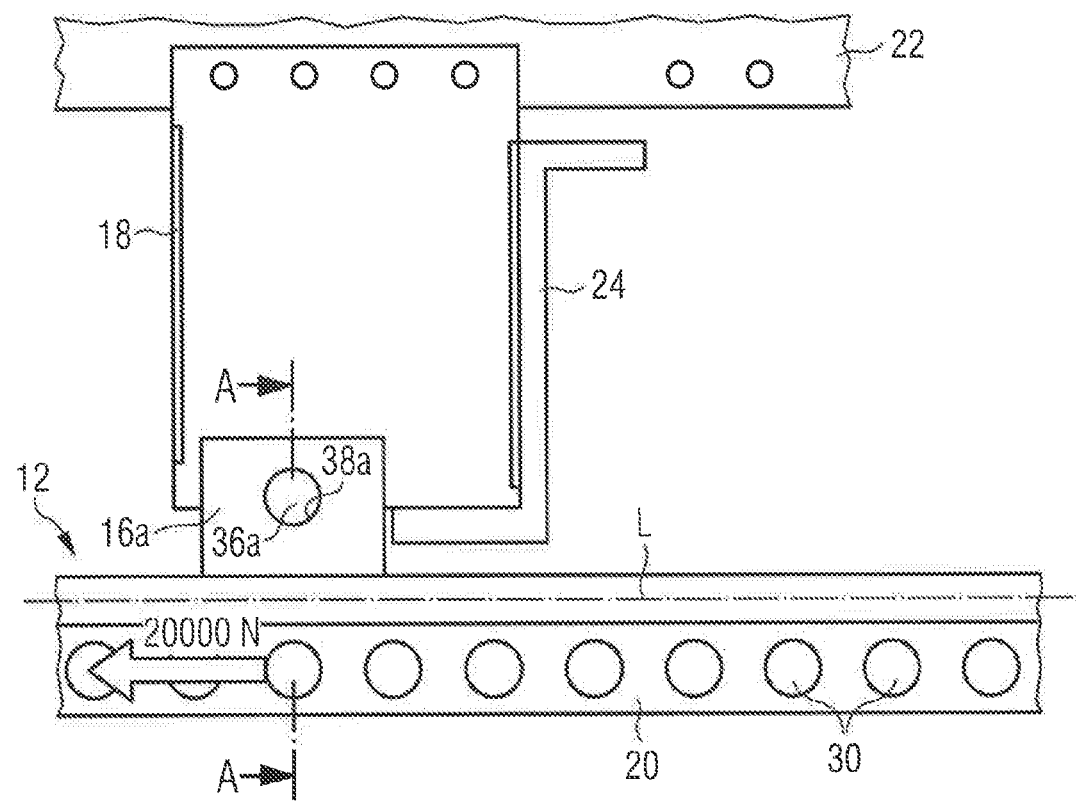
FIG 3b  A-A
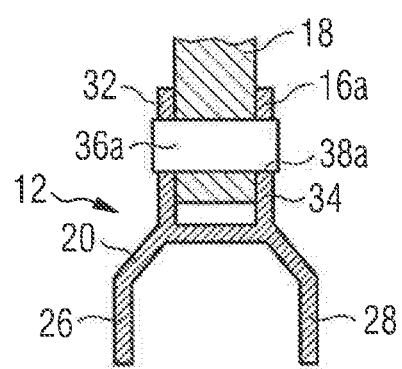

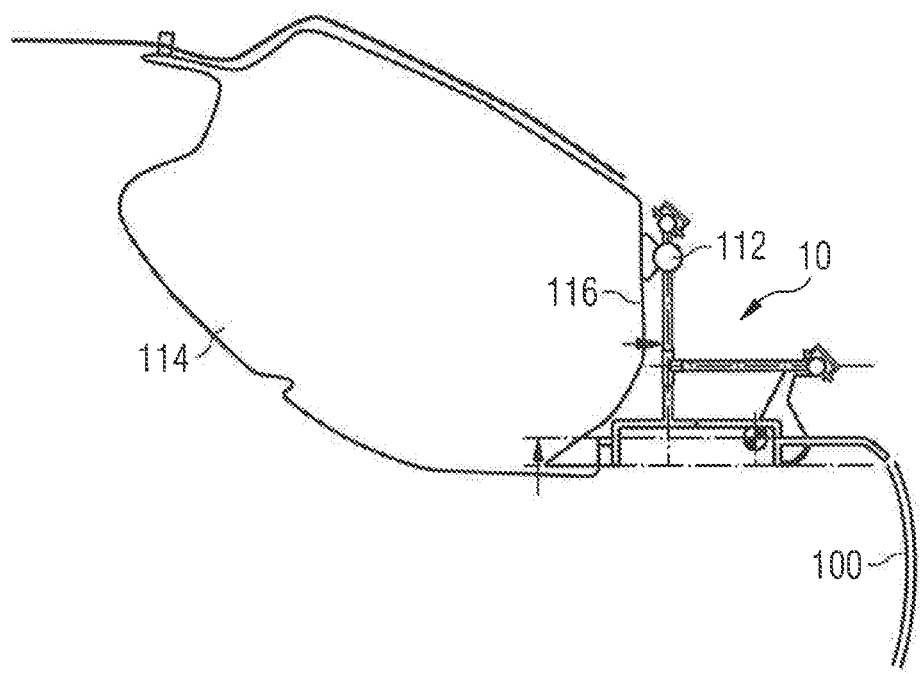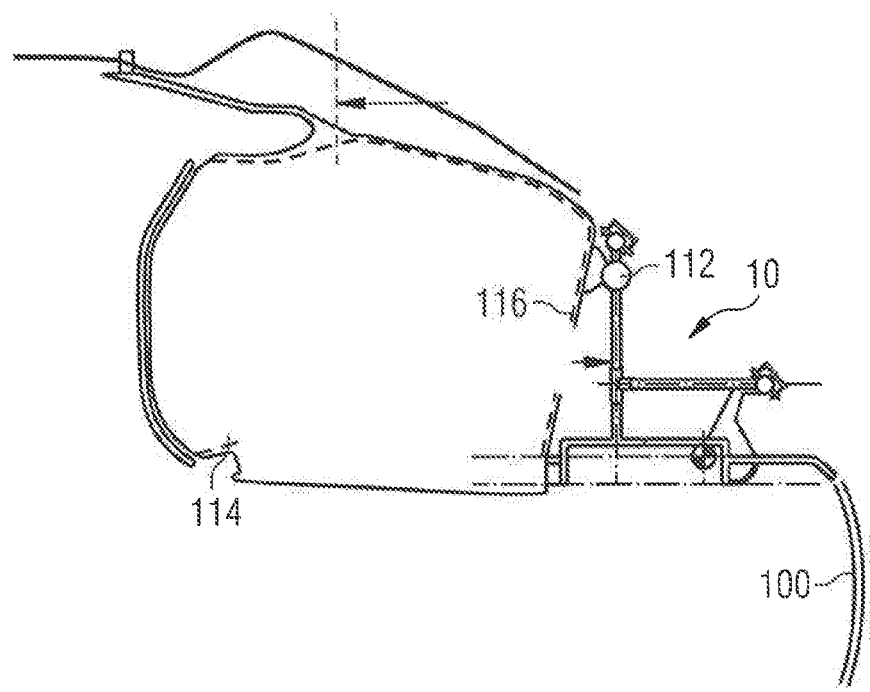

INTERIOR COMPONENT CARRIER SYSTEM AND METHOD FOR MOUNTING AN INTERIOR COMPONENT CARRIER SYSTEM

CROSS-REFERENCES TO RELATED APPLICATIONS

This application claims the benefit of the European patent application No. 16178035.8 filed on Jul. 5, 2016, the entire disclosures of which are incorporated herein by way of reference.

BACKGROUND OF THE INVENTION

The present invention relates to an interior component carrier system, in particular for use in an aircraft, and a method for mounting an interior component carrier system, in particular in an aircraft.

When installing interior components, such as, for example, overhead luggage compartments, personal service units (PSUs), piping and wiring, lining panels, etc., in an aircraft, it is currently customary to connect the interior components to the aircraft structure individually. Since each component has to be positioned separately and fastened to the aircraft structure sequentially, the mounting of these components is very time-consuming. In addition, after installation of certain large interior components, such as overhead luggage compartments, areas of the aircraft interior arranged, for example, between the interior compartments and the aircraft's primary structure, are accessible only with difficulties or not at all. As a consequence, these areas cannot be used for the installation of further interior components.

In order to simplify the installation of interior components, EP 2 435 311 B1 and U.S. Pat. No. 9,056,685 B2 describe a method for mounting interior components in an aircraft, wherein a first and a second interior component are pre-mounted, secured to a mounting device and connected to form an individual module. A plurality of individual modules which are secured to the mounting device are interconnected to form a large module which is secured to the mounting device. This large module is detached from the mounting device and transported to an end mounting position in an aircraft fuselage element. Finally, the large module is mounted in the aircraft fuselage element.

For transporting the large module to its end mounting position in the aircraft usage element, a transport device as described in EP 2 435 310 B1 and US 2012/131779 A1 may be used.

SUMMARY OF THE INVENTION

It is an object of the present invention to provide an interior component carrier system that simplifies the installation of interior components, in particular in an aircraft, and allows a particularly efficient utilization of limited installation space, in particular on board an aircraft. A further object of the present invention is to provide a method for mounting an interior component carrier system of this kind.

An interior component carrier system which is, in particular, suitable for use in an aircraft comprises a first and a second installation rail. Each of the first and the second installation rails comprises at least one connecting portion which is connectable to an associated primary structure component in order to fasten the installation rail to the primary structure component. The connecting portions of the first and the second installation rails may have a substantially U-shaped cross-section with two arms that extend in the direction along the longitudinal axis of the interior component carrier system so as to receive an associated primary structure component therebetween. Such a configuration of the connecting portions allows fast and secure connection of the installation rails to associated primary structure components. The primary structure component may, for example, be an aircraft primary structure component, e.g., a frame or a fastening cleat protruding from a stringer and serving to attach a frame to the stringer.

Further, each of the first and the second installation rails comprises a carrier portion extending from the connecting portion in a direction along a longitudinal axis of the interior component carrier system. Each carrier portion may comprise two arms extending parallel to each other in a direction along the longitudinal axis of the interior component carrier system. A plurality of openings arranged one behind another in the direction along the longitudinal axis of the interior component carrier system may be formed in the carrier portions, i.e., the arms of the carrier portions, wherein associated openings formed in the arms of the carrier portions may be aligned with each other.

The interior component carrier system further comprises a first carrier element having a first end and a second end. The first end of the first carrier element is connected to a first carrier rod. The second end of the first carrier element is connectable to a first interior component, in particular a first aircraft interior component. The first carrier rod connected to the first end of the first carrier element extends in a direction along the longitudinal axis of the interior component carrier system and is fastened to the carrier portion of the first installation rail. Preferably, the first carrier rod is fastened to the carrier portion of the first installation rail by means of at least one fastener designed, for example, in the form of a bolt which is guided through a bore provided in the first carrier rod and through associated aligned openings formed in the arms of the carrier portion of the first installation rail. When the interior component carrier system is installed in an aircraft, the first carrier element preferably extends substantially parallel to a z-axis of the aircraft, i.e., the axis extending substantially perpendicular to an aircraft cabin floor.

A second carrier element of the interior component carrier system also has a first end and a second end. The first end of the second carrier element is connected to a second carrier rod. The second end of the second carrier element is connected to the first carrier element. The second carrier rod connected to the first end of the second carrier element extends in a direction along the longitudinal axis of the interior component carrier system and is fastened to the carrier portion of the second installation rail. Preferably, the second carrier rod is fastened to the carrier portion of the second installation rail by means of at least one fastener designed, for example, in the form of a bolt which is guided through a bore provided in the second carrier rod and through associated aligned openings formed in the arms of the carrier portion of the second installation rail. Preferably, the second carrier element extends substantially perpendicular to the first carrier element. When the interior component carrier system is installed in an aircraft, the second carrier element preferably extends substantially parallel to a y-axis of the aircraft, i.e., a transverse axis extending substantially parallel to an aircraft cabin floor.

The interior component carrier system can be used as an interface for installing not only the first interior component, but also further interior components in particular aircraft interior components, thus eliminating the necessity to individually fasten the interior components to the primary structure. As a result, in case the interior component carrier system is used in an aircraft, customer requirements can be met by adjusting the interior component carrier system, but without the need to redesign the aircraft's primary structure.

Consequently, the interior component carrier system and, as desired, additional interior components may be pre-assembled in a comfortable manner and thereafter installed in a single mounting step. For example, wiring and piping for connecting interior components attached to the interior component carrier system to subordinate supply systems can be attached to the interior component carrier system in a simple manner. In addition, the interior component carrier system is flexible enough to allow a displacement of the system, for example along a track perpendicular of an aircraft fuselage, for example by means of a mounting jig, without tilting. As a result, the installation of interior components and associated supply systems is significantly simplified.

In addition, an available installation space can be utilized in a particularly efficient manner, since the installation of interior components and the supply systems is no longer affected by a restricted accessibility of the installation space. For example, electric lines and/or fluid lines can be attached to the interior component carrier system and tested remote from the installation site so as to be finally arranged between a large interior component, such as overhead luggage compartment, and the primary structure. Consequently, installation space which otherwise due to limited accessibility cannot be used, is made usable.

In a preferred embodiment, the interior component carrier system comprises an attachment device. The attachment device may be fastened to the first carrier element. Furthermore, the attachment device may be adapted to be connected to a second interior component, in particular a second interior component. The attachment device may be fastened to the first carrier element in such a manner that the attachment device is displaceable relative to the first carrier element. In particular, the attachment device may be displaceable relative to the first carrier element in a direction substantially parallel to the z-axis of an aircraft equipped with the interior component carrier system.

The attachment device may be adapted to establish a snap and click connection between the second interior component and the interior component carrier system. The interior component carrier system then may be installed in a comfortable manner and thereafter, the second interior component may be mounted in its final assembly position by simply connecting the second interior component to the interior component carrier system via the attachment device.

The first interior component may be designed in the form of a cove light panel. Thus, the second end of the first carrier element preferably is connectable, i.e., adapted to be connected to a first interior component designed in the form of a cove light panel. Preferably, the first carrier element is designed so as to allow a first interior component designed in the form of a cove light panel to be connected to the interior component carrier system in such a manner that the cove light panel extends substantially perpendicular to the first carrier element. A first interior component designed in the form of a cove light panel may have a first portion and a second portion. The first portion may be designed in the form of receptacle for receiving personal service components and a lighting element as well as electrical connections for the lighting element. The second portion may extend from the first portion and form a lining element which, when the interior component carrier system and the first interior component are mounted in an aircraft, closes a gap existing in a direction along the y-axis of the aircraft between the first portion of the cove light panel and a sidewall lining element. Further, the first interior component which preferably is designed in the form of a cove light panel may have maintenance openings which may be used for installing/deinstalling electrical components without deinstalling the first interior component and/or the second interior component.

Additionally or alternatively thereto, the second interior component may be an overhead luggage compartment. Thus, the attachment device which is fastened to the first carrier element preferably is connectable, i.e., adapted to be connected to a second interior component designed in the form of an overhead luggage compartment. The interior component carrier system then also allows a particularly easy installation of an overhead luggage compartment in an aircraft. Further, since it is no longer necessary to establish a direct connection between the overhead luggage compartment and the aircraft's primary structure, the overhead luggage compartment can be equipped with a substantially straight back wall which, via the attachment device, can be connected to the interior component carrier system.

As a result, the design of the overhead luggage compartment can be simplified. In addition, installation space which otherwise is occupied by the overhead luggage compartment, but, due to its shape, not fully usable for receiving luggage items, can be used otherwise, for example for receiving wiring and piping. As already discussed above, these components can be installed in a comfortable manner and without accessibility restrictions prior to the installation of the overhead luggage compartment. Finally, if necessary, the second interior component can be replaced and aligned quite easily so as to compensate for potential tolerances.

The interior component carrier system preferably further comprises a third carrier element. The third carrier element may have a first end which is connected to the second carrier element and a second end which is connectable, i.e., adapted to be connected to the first interior component. Preferably, the third carrier element extends from the second carrier element substantially parallel to a portion of the first carrier element which is connectable to the first interior component. The third carrier element increases the structural stability of the interior component carrier system and in particular serves to securely fasten the first interior component to the interior component carrier system.

The first carrier element may be designed so as to have an adjustable length. In particular, a length of the first carrier element may be adjustable in a direction along a longitudinal axis of the first carrier element. In order to achieve this, the first carrier element may comprise a first portion and a second portion which may be connected to each other by means of a sleeve nut. For example, each of the first and the second portion of the first carrier element may be provided with an external thread which interacts with an internal thread of the sleeve nut in order to allow a displacement of the first and the second portion of the first carrier element relative to each other in a direction along the longitudinal axis of the first carrier element.

Alternatively or additionally thereto, the second carrier element may also be designed so as to have an adjustable length. In particular, a length of the second carrier element may be adjustable in a direction along a longitudinal axis of the second carrier element. In order to achieve this, the second carrier element may comprise a first portion and a second portion which may be connected to each other by means of a sleeve nut. For example, each of the first and the second portion of the second carrier element may be provided with an external thread which interacts with an internal thread of the sleeve nut in order to allow a displacement of the first and the second portion of the second carrier element relative to each other in a direction along the longitudinal axis of the second carrier element.

By adjusting the length of the first and/or the second carrier element, tolerances of the primary structure component and tolerances of the interior component carrier system may be compensated for. This allows a particularly easy installation of the interior component carrier system. Preferably, the first and/or the second carrier element also is provided with a locking mechanism which allows to lock the portions of the first and/or the second carrier element relative to each other in their position after adjustment of the length of the first and/or the second carrier element.

The primary structure of an aircraft typically comprises a plurality of stringers extending substantially parallel to each other along a longitudinal axis of the aircraft fuselage and carrying the aircraft outer skin. A plurality of frames that extend substantially parallel to each other in a circumferential direction of the aircraft fuselage are attached to the stringers via suitable fastening cleats protruding from the stringers in a direction towards an interior of the aircraft fuselage. In order to allow the interior component carrier system to be securely fastened to the aircraft's primary structure, each of the first and the second installation rails preferably comprises a plurality of connecting portions arranged one behind another in a direction along an x-axis, i.e., a longitudinal axis of the aircraft. Each connecting portion may be connectable to an associated one of a plurality of primary structure components. For example, each connecting portion may be connectable to an associated fastening cleat protruding from a stringer and serving to attach a frame to the stringer.

The components of the aircraft's primary structure are positioned with certain tolerances. In particular, the typical positional tolerance for the fastening cleats and the frames is ±3 mm in a direction along the x-axis of the aircraft fuselage. Further, during flight operation of an aircraft, the aircraft outer skin typically is exposed to temperatures in the range of about −55° C. An aircraft cabin in the interior of the aircraft fuselage, however, usually is held at a temperature of approximately +20° C., resulting in a temperature difference between the aircraft outer skin and the aircraft cabin during flight operation of the aircraft of approximately 75° C. To the contrary, during ground operation of the aircraft, the temperature difference between the aircraft outer skin and the aircraft cabin usually is much less than during flight operation of the aircraft. Due to thermally induced deformations, the distances between adjacent fastening cleats and frames thus vary in dependence on whether the aircraft is on the ground or in flight.

Therefore, in a preferred embodiment of the interior component carrier system, a first connecting portion may be configured to interact with an associated first primary structure component in order to define a fixed bearing adapted to connect the first connecting portion and the associated first primary structure component so as to be non-displaceable relative to each other in a direction along the longitudinal axis of the interior component carrier system. Preferably, the first connecting portion and the associated first primary structure component, in the direction along the longitudinal axis of the interior component carrier system, is arranged in a central position. For example, in case the interior component carrier system comprises five connecting portions, the first connecting portion and the associated first primary structure component, in the direction along the longitudinal axis of the interior component carrier system, may be arranged at a third position.

Further, at least one second connecting portion may be configured to interact with an associated second primary structure component in order to define a floating bearing adapted to connect the second connecting portion and the associated second primary structure component so as to be allow a relative displacement between the second connecting portion and the associated second primary structure component in a direction along the longitudinal axis of the interior component carrier system. The floating bearing allows a displacement of the second primary structure component relative to the first primary structure component and also relative to the associated second connecting portion and hence the entire installation rails and thus prevents the development of stresses resulting from such a displacement in both the primary structure components and the installation rails. Consequently, a displacement of the second primary structure component relative to the first primary structure component and the installation rails which may result, for example, from a thermally induced deformation of the primary structure components can be compensated for.

In a preferred embodiment of the interior component carrier system, the design of a floating bearing defined by a second connecting portion of the interior component carrier system and a second primary structure component varies in dependence on a distance of the second primary structure component from the first primary structure component. In particular, a floating bearing should be designed so as to be able to compensate for a larger relative displacement between the second primary structure component and the associated second connecting portion in the direction along the longitudinal axis of the interior component carrier system the farther away the floating bearing is arranged from the fixed bearing defined by the first primary structure component and the associated first connecting portion.

The interior component carrier system may further comprise a plurality of load transmission elements. Each load transmission element may be a rigidly connectable to one of the first or the second installation rail and a second primary structure component which, together with an associated second connecting portion, defines a floating bearing. Each load transmission element may comprise a first contact face adapted to interact with a complementary second contact face provided on the other one of the first or the second installation rail and the second primary structure component, in order to transfer loads acting in the direction along the longitudinal axis of the interior component carrier system from the first or the second installation rail to the second primary structure component. Thus, in case the load transmission element is rigidly connected to the first or the second installation rail, the first contact face provided on the load transmission element may interact with a complementary second contact face provided on the second primary structure component in order to transfer loads acting in the direction along the longitudinal axis of the interior component carrier system from the first or the second installation rail to the second primary structure component. To the contrary, in case the load transmission element is rigidly connected to the second primary structure component, the first contact face provided on the load transmission element may interact with a complementary second contact face provided on the first or the second installation rail in order to transfer loads acting in the direction along the longitudinal axis of the interior component carrier system from the first or the second installation rail to the second primary structure component.

In a first operational state of the interior component carrier system, a gap may be present between the first and the second contact face, in the direction along the longitudinal axis of the interior component carrier system. To the contrary, in a second operational state of the interior component carrier system, the first and the second contact face may contact each other. The interaction between the first and the second contact face, in particular in the second operational state of the installation rail arrangement, ensures an optimum transmission of loads acting in the direction along the longitudinal axis of the interior component carrier system from the first or the second installation rail to the primary structure components. Thus, the interior component carrier system meets the load bearing and load transmission requirements for primary structure interfaces, in particular aircraft primary structure interfaces.

In a preferred embodiment of the interior component carrier system, the gap which is present between the first and the second contact face in the first operational state of the interior component carrier system is dimensioned in such a manner that the gap is eliminated due to a thermally induced repositioning of the primary structure components upon changing the operational state of the interior component carrier system from the first operational state to the second operational state. The first operational state of the interior component carrier system may, for example, be a ground operational state, i.e., a state wherein an aircraft equipped with the interior component carrier system is operated on the ground. In a ground operational state of the interior component carrier system only a limited temperature difference exists between an aircraft environment and an interior of the aircraft. Hence the second primary structure component is arranged at a first distance from the first primary structure component which allows the gap to be present between the first and the second contact face.

The second operational state of the interior component carrier system may, for example, be a flight operational state, e. a state wherein an aircraft equipped with the interior component carrier system is operated in flight. In a flight operational state of the interior component carrier system, a significant temperature difference exists between an aircraft environment and an interior of the aircraft. Hence the second primary structure component is arranged at a second distance from the first primary structure component which is smaller than the first distance between the second primary structure component and the first primary structure component in the first operational state. In case the gap, i.e., the distance between the first and the second contact face in the first operational state of the interior component carrier system is adjusted to the thermally induced repositioning, the primary structure components experience upon changing the operational state of the interior component carrier system from a ground operational state to a flight operational state, the gap between the first and the second contact face is closed and, in the flight operational state of the interior component carrier system, the first and the second contact face contact each other.

In a method for mounting an interior component carrier system a first and a second installation rails are provided, wherein each of the first and the second installation rails includes at least one connecting portion and a carrier portion. The carrier portion extends from the connecting portion in a direction along a longitudinal axis of the interior component carrier system. A first carrier element which has a first end connected to a first carrier rod extending in a direction along the longitudinal axis of the interior component carrier system and a second end is connected to the first installation rail by fastening the first carrier rod to the carrier portion of the first installation rail. A second carrier element which has a first end connected to a second carrier rod extending in a direction along the longitudinal axis of the installation component carrier system and a second end is connected to the second installation rail by fastening the second carrier rod to the carrier portion of the second installation rail. The second and of the second carrier element is connected to the first carrier element. The connecting portion of each of the first and the second installation rails is connected to an associated primary structure component.

In a preferred embodiment of the method for mounting an interior component carrier system, the first and the second installation rails are fastened to a mounting jig arranged remote from an installation site, for example outside of an aircraft. An arrangement comprising the first and the second installation rails, the first and the second carrier rod, the first and the second carrier element and the first interior component may be pre-assembled while the first and the second installation rails are fastened to the mounting jig. On the mounting jig, the elements of the interior component carrier system may be arranged in a position that is comfortable to reach. The pre-assembled arrangement may be mounted at its final installation position by connecting the connecting portion of each of the first and the second installation rails to an associated primary structure component. In case the pre-assembled arrangement should be installed in an aircraft, the pre-assembled arrangement may be designed so as to extend along substantially the entire length of an aircraft fuselage that should be equipped with the pre-assembled arrangement.

At least one of the first and the second installation rails may be fastened to the mounting jig by connecting its respective carrier portion to an associated mounting rod provided on the mounting jig. The fastening of the interior component carrier system to the mounting jig upon pre-assembly thus can be achieved particularly easily and without additional components.

The pre-assembled arrangement comprising the first and the second installation rails, the first and the second carrier rod, the first and the second carrier element and the first interior component may be transported to its final installation position by means of a transport unit. Basically, the transport unit may be a separate unit to which the pre-assembled arrangement is transferred from the mounting jig. In a particular preferred embodiment of the method for mounting an interior component carrier system, the transport unit, however, forms a part of the mounting jig. A transfer from the mounting jig to the transport unit thus can be dispensed with. For example, the mounting jig may comprise a base structure having wheels which allow the mounting jig to be also used for transporting the pre-assembled arrangement to its final installation position.

The pre-assembled arrangement comprising the first and the second installation rails, the first and the second carrier rod, the first and the second carrier element and the first interior component may be moved to its final installation position by means of a lifting device. The lifting device may, for example, comprise a step motor which allows the pre-assembled arrangement to be positioned in its final installation position so that the connecting portions of the first and the second installation rails may be attached to the associated primary structure components. Consequently, the elements of the interior component carrier system, upon pre-assembly on the mounting jig, can be arranged so as to be comfortably accessible and thereafter lifted to their final installation position.

The lifting device may be a separate unit to which the pre-assembled arrangement is transferred from the transport unit. Preferably, however, the lifting device forms a part of the transport unit. In a particular preferred embodiment, the lifting device forms a part of a transport unit which in turn forms a part of the mounting jig.

The pre-assembled arrangement comprising the first and the second installation rails, the first and the second carrier rod, the first and the second carrier element and the first interior component, upon being moved to its final installation position, may be oriented in such a manner that an edge of the first interior component that extends in a direction along the longitudinal axis of the interior component carrier system is aligned with a master line defining a desired position of the edge of the first interior component. For example, in case the pre-assembled arrangement should be mounted in an aircraft, the pre-assembled arrangement, by means of the mounting jig, i.e., the transport unit of the mounting jig may be moved into the aircraft and the mounting jig may be oriented with respect to seat rails provided in a floor of an aircraft cabin. A leveling of the position of the mounting jig along a x-axis and an y-axis of the aircraft fuselage thus can be dispensed with. Thereafter, the pre-assembled arrangement may be lifted until the edge of the first interior component is aligned with the master line.

A length of the first carrier element may be adjusted in a direction along a longitudinal axis of the first carrier element. This adjustment may be achieved by moving a first portion and a second portion of the first carrier element which are connected to each other by means of a sleeve nut relative to each other in the direction along the longitudinal axis of the first carrier element. For example, a displacement of the first and the second portion of the first carrier element relative to each other in a direction along the longitudinal axis of the first carrier element may be achieved by the interaction of external threads provided on each of the first and the second portion of the first carrier element with an internal thread of the sleeve nut.

Alternatively or additionally thereto, a length of the second carrier element may be adjusted in a direction along a longitudinal axis of the second carrier element. This adjustment may be achieved by moving a first portion and a second portion of the second carrier element which are connected to each other by means of a sleeve nut relative to each other in the direction along the longitudinal axis of the second carrier element. For example, a displacement of the first and the second portion of the second carrier element relative to each other in a direction along the longitudinal axis of the second carrier element may be achieved by the interaction of external threads provided on each of the first and the second portion of the second carrier element with an internal thread of the sleeve nut.

By adjusting the length of the first and/or the second carrier element, tolerances of the primary structure component and tolerances of the interior component carrier system may be compensated for and hence a particularly easy installation of the interior component carrier system is made possible.

In a preferred embodiment of the method for mounting an interior component carrier system, a second interior component, which, in particular, is designed in the form of an overhead luggage compartment, may be connected to the first carrier element via an attachment device which is fastened to the first carrier element, preferably after mounting the pre-assembled arrangement comprising the first and the second installation rails, the first and the second carrier rod, the first and the second carrier element and the first interior component in its final installation position. Upon mounting, the second interior component may be oriented relative to the master line. As a result, the second interior component can be installed in a comfortable and fast manner. Further, components such as, for example wiring and piping can be mounted in the installation space provided between the second interior component and the primary structure prior to the installation of the second interior component without accessibility restrictions.

Alternatively or additionally thereto, a first end of a third carrier element may be connected to the second carrier element. Further, a second end of the third carrier element may be connected to the first interior component, preferably prior to detaching the pre-assembled arrangement comprising the first and the second installation rails, the first and the second carrier rod, the first and the second carrier element and the first interior component from the mounting jig.

One of a plurality of connecting portions arranged one behind another in a direction along the longitudinal axis of the interior component carrier system on each of the first and the second installation rails may be connected to an associated one of a plurality of primary structure components. A first connecting portion may interact with an associated first primary structure component in order to define a fixed bearing adapted to connect the first connecting portion and the associated first primary structure component so as to be non-displaceable relative to each other in a direction along the longitudinal axis of the interior component carrier system. At least one second connecting portion may interact with an associated second primary structure component in order to define a floating bearing adapted to connect the second connecting portion and the associated second primary structure component so as to allow a relative displacement between the second connecting portion and the associated second primary structure component in a direction along the longitudinal axis of the interior component carrier system.

The method for mounting an interior component carrier system may further comprise the step of providing a plurality of load transmission elements, wherein each load transmission element may comprise a first contact face. Each load transmission element may be a rigidly connected to one of the first or the second installation rail and a second primary structure component, such that the first contact face of the load transmission element interacts with a complementary second contact face provided on the other one of the first or the second installation rail and the second primary structure component, in order to transfer loads acting in a direction along the longitudinal axis of the interior component carrier system from the first or the second installation rail to the second primary structure component. In a first operational state of the interior component carrier system, a gap may be present between the first and the second contact face, in the direction along the longitudinal axis of the interior component carrier system. To the contrary, in a second operational state of the interior component carrier system, the first and the second contact face may contact each other.

BRIEF DESCRIPTION OF THE DRAWINGS

Preferred embodiments of an interior component carrier system and a method of mounting an interior component carrier system are described in greater detail with reference to the attached schematic drawings in the following, wherein FIGS. 12 and 13 show the interior component carrier system according to FIG. 1 in a state installed in an aircraft and connected to a second interior component designed in the form of an overhead luggage compartment.

DETAILED DESCRIPTION OF THE PREFERRED EMBODIMENTS

Figure 1:
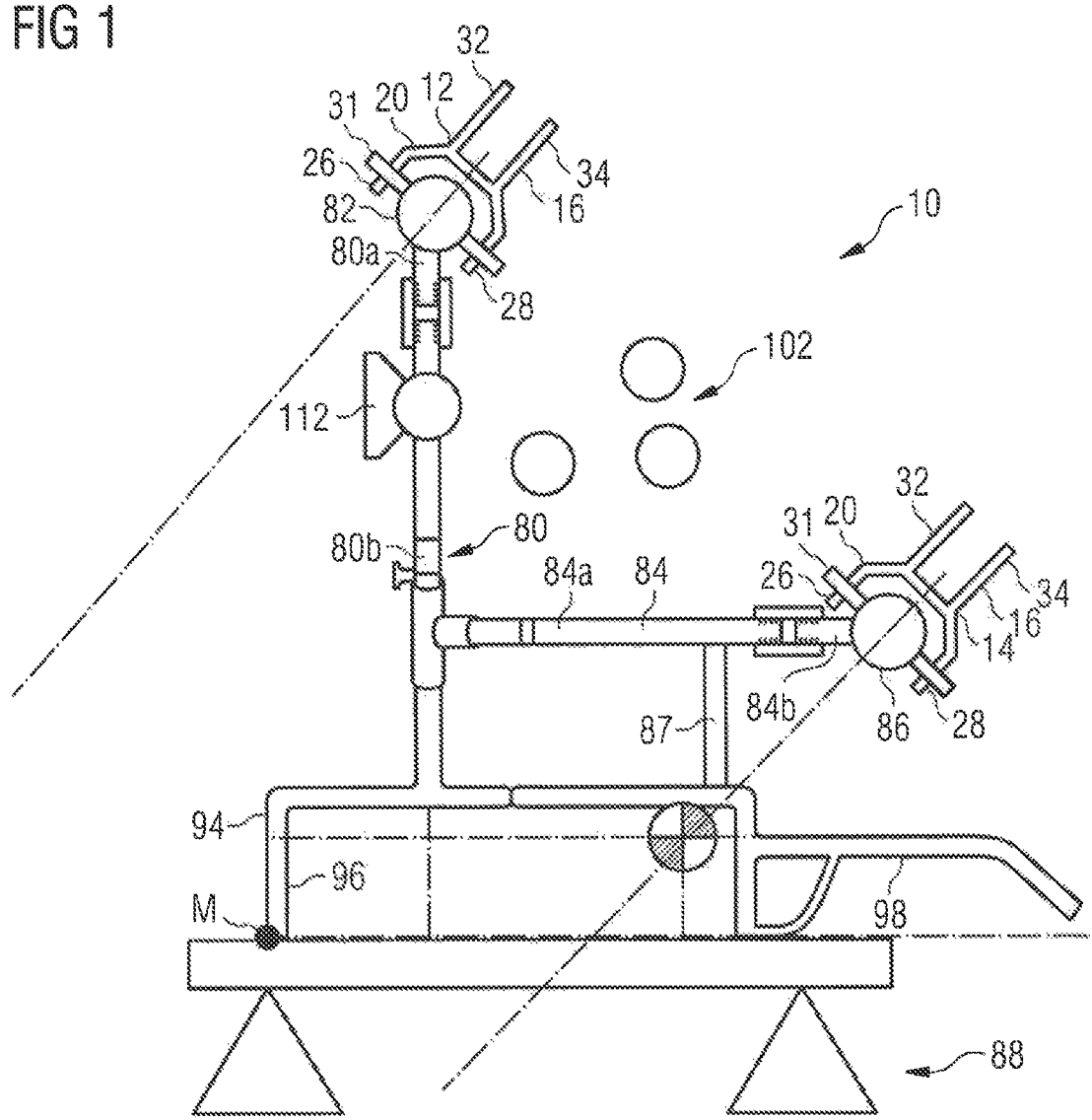
FIG. 1 shows a cross-sectional view of an interior component carrier system, FIGS. 2a and b show a side view an installation rail of the interior component carrier system according to FIG. 1, wherein the installation rail is attached to an aircraft primary structure, and wherein interior component carrier system is in a first operational state (FIG. 2a) and a second operational state (FIG. 2b), FIGS. 3a and b show a fixed bearing suitable for fixing the installation rail according to FIGS. 2a and b to the aircraft primary structure.

FIG. 1 shows an interior component carrier system 10 which comprises a first and a second installation rail 12, 14. In the embodiment of an interior component carrier system 10 depicted in the drawings, the second installation rail 14 is designed identical to the first installation rail 12. A side view the first installation rail 12 of the interior component carrier system 10 according to FIG. 1 is shown in FIGS. 2a and b. In the arrangement according to FIGS. 2a and b, the first installation rail 12 is attached to an aircraft primary structure. As becomes apparent from FIGS. 1 and 2a and b, the first and the second installation rails 12, 14 include at least one connecting portion 16 which is connectable to an associated primary structure component 18 in order to fasten the installation rails 12, 14 to the primary structure component 18. Further, each of the first and the second installation rails 12, 14 includes a carrier portion 20 which extends from the connecting portion 16 in a direction along a longitudinal axis L of the primary structure component 18.

The first and the second installation rails 12, 14 are designed in such a manner that all electrical devices that are necessary in an aircraft cabin can be received and that all wirings can be installed while meeting any flexibility and customization requirements. Further, the first and the second installation rails 12, 14 allow the wirings to be guided behind modules and monuments without interruptions. The wirings may be provided with interface plates and plugs only at section divisions where also the interior component carrier system 10 ends. In addition, by means of the rails 12, 14, ventilation lines may be installed.

The installation rails 12, 14 also provide a continuous interface which is suitable to be applied with loads to be introduced into the primary structure of the aircraft. The provision of individual attachment or load introduction points on the primary structure, however, can be dispensed with. As a result, an aircraft cabin can be designed and redesigned in a particularly flexible manner. For example, monuments, such as sanitary modules or galleys can be displaced within the aircraft cabin without adjusting the primary structure.

In particular, as depicted in FIGS. 2a and b, each of the first and the second installation rails 12, 14 comprises a plurality of connecting portions 16 which are arranged one behind another in a direction along a longitudinal axis L of the interior component carrier system 10. Each connecting portion 16 is connectable to an associated one of a plurality of primary structure components 18. In the embodiment of an interior component carrier system 10 depicted in the drawings, the primary structure components 18 are designed in the form of fastening cleats that protrude from a stringer 22 and serve to attach a frame 24 to the stringer 22. The carrier portion 20 extends from the plurality of connecting portions 16 in the direction along the longitudinal axis L of the interior component carrier system 10.

As shown in FIG. 1, the carrier portion 20 of each installation rail 12, 14 comprises two arms 26, 28 extending parallel to each other in the direction along the longitudinal axis L of the interior component carrier system 10. A plurality of openings 30 arranged one behind another in the direction along the longitudinal axis L of the interior component carrier system 10 is formed in the carrier portion 20 of each installation rail 12, 14, i.e., the arms 26, 28 of the carrier portion 20, wherein associated openings 30 formed in the arms 26, 28 of the carrier portion 20 are aligned with each other. Each of the openings 30 or pairs of openings 30 is adapted to receive a fastener 31 for attaching an equipment component to the carrier portion 20 of the installation rails 12, 14. In the arrangement of FIG. 1, the fastener 31 is designed in the form of a bolt which is guided through associated aligned openings 30 formed in the arms 26, 28 of the installation rails 12, 14.

As also shown in FIGS. 1, 2a and 2b, the connecting portions 16 of each installation rail 12, 14 each have a substantially U-shaped cross-section with two arms 32, 34 that extend in in the direction along the longitudinal axis L of the interior component carrier system 10 at a distance from each other so as to receive an associated primary structure component 18 therebetween. A fastening bolt 36 which is received in a bore 38 extending through the primary structure component 18 and the associated connecting portion 16 in a direction substantially perpendicular to the longitudinal axis L of the interior component carrier system 10 connects the connecting portion 16 of the installation rails 12, 14 to the associated primary structure component 18.

A first connecting portion 16a and an associated first primary structure component 18a define a fixed bearing that is adapted to connect the first connecting portion 18 a and the associated first primary structure component 18a so as to be non-displaceable relative to each other in the direction along the longitudinal axis L of the interior component carrier system 10. As becomes apparent from FIGS. 2a and b, the first connecting portion 16a and the associated first primary structure component 18a, in the direction along the longitudinal axis L of the interior component carrier system 10, is arranged in a central position of the interior component carrier system 10.

The configuration of the fixed bearing defined by the first connecting portion 16a and the associated first primary structure component 18a is depicted in greater detail in FIGS. 3a and b. The first connecting portion 16a and the associated first primary structure component 18a are connected to each other by means of a first fastening bolt 36a. The first fastening bolt 36a is received in a corresponding first bore 38a extending through the first connecting portion 16a and the associated first primary structure component 18a in a direction substantially perpendicular to the longitudinal axis L of the interior component carrier system 10. In particular, the first bore 38a extends through the arms 32, 34 of the first connecting portion 26a and a region of the first primary structure component 18a received between the arms 32, 34. In the arrangement depicted in FIGS. 3a and b, the first fastening bolt 36a and the first bore 38a are shaped and dimensioned so as to allow the first fastening bolt 36a to be received in the first bore 38a in a form-fit manner. In particular, the first fastening bolt 36a and the first bore 38b have corresponding circular cross-sectional shapes.

At least one second connecting portion 16b is configured to interact with an associated second primary structure component 18b in order to define a floating bearing adapted to connect the second connecting portion 16b and the associated second primary structure component 18b so as to be allow a relative displacement between the second connecting portion 16b and the associated second primary structure component 18b and the associated second connecting portion 20b in a direction along the longitudinal axis L of the interior component carrier system 10. In the configuration shown in FIGS. 2a and b, four pairs of a second connecting portion 16b and an associated second primary structure component 18b that define a floating bearing are provided. Each floating bearing allows a displacement of the second primary structure component 18b relative to the first primary structure component 18a and also relative to the associated second connecting portion 16b and hence the entire installation rail 12, 14 and thus prevents the development of stresses resulting from such a displacement in both the primary structure components 18 and the installation rails 12, 14.

In the arrangement depicted in FIGS. 2a and b, the design of the floating bearings defined by a respective pair of a second connecting portion 16b and an associated second primary structure component 18b varies in dependence on a distance of the second primary structure component 18b from the first primary structure component 18a. In particular, the floating bearings are designed so as to be able to compensate for a larger relative displacement between the second primary structure component 18b and the associated second connecting portion 16b in the direction along the longitudinal axis L of the interior component carrier system 10 the farther away the floating bearing is arranged from the fixed bearing defined by the first connecting portion 16a and the associated first primary structure component 18a.

Figure 4:
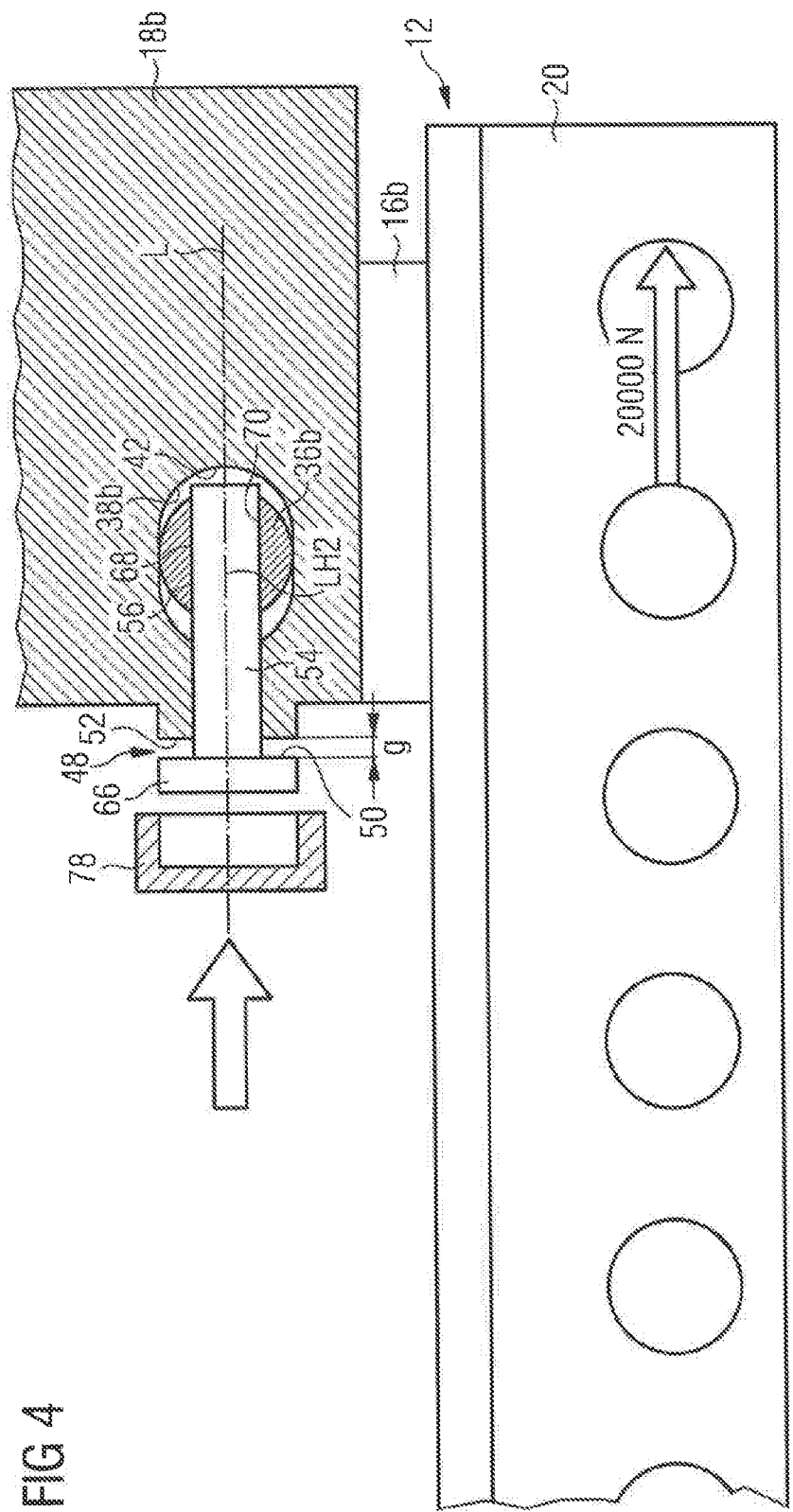
FIG. 4 shows a load transmission element suitable for fixing the installation rail according to FIGS. 2a and b to the aircraft primary structure.

As becomes apparent from FIG. 4, a second connecting portion 16b and an associated second primary structure component 18b which define a floating bearing are connected to each other by means of a second fastening bolt 36b which is received in a corresponding second bore 38b extending through the second connecting portion 16b and the associated primary structure component 18b in a direction substantially perpendicular to the longitudinal axis L of the interior component carrier system 10. The second fastening bolt 36b and a first portion 40 of the second bore 38b that extends through the second connecting element 16b are shaped and dimensioned so as to allow the second fastening bolt 36a to be received in the first portion 40 of the second bore 38b in a form-fit manner. The second fastening bolt 36b and a second portion 42 of the second bore 38b that extends through the second primary structure component 18b, however, are shaped and dimensioned so as to allow a displacement of the second fastening bolt 36b in the second portion 42 of second bore 38b in the direction along the longitudinal axis L of the interior component carrier system 10.

In particular, the second fastening bolt 36b and the first portion 40 of the second bore 38b have corresponding circular cross-sectional shapes. The second portion 42 of the second bore 38b, however, is designed as an elongated hole with a longitudinal axis LH2 extending parallel to the longitudinal axis L of the interior component carrier system 10. As a result, the second fastening bolt 36b can be displaced within the second portion 42 of the second bore 38b, thus allowing a relative displacement between the second primary structure component 18b and the associated second connecting portion 16b and hence the installation rail 12, 14 in the direction along the longitudinal axis L of the interior component carrier system 10.

The interior component carrier system 10 further comprises a plurality of load transmission elements 48. Each load transmission element 48 is rigidly connected to one of an installation rail 12, 14 and a second primary structure component 18b which, together with an associated second connecting portion 16b, defines a floating bearing. In the arrangement depicted in FIGS. 2a and b, each load transmission element 48 is rigidly connected to the installation rail 12, 14 via the second fastening bolt 36b that is received in the first portion 40 of the second bore 38b in a non-displaceable manner.

Each load transmission element 48 comprises a first contact face 50 adapted to interact with a complementary second contact face 52 provided on the other one of the installation rail 12, 14 and the second primary structure component 18b, in order to transfer loads acting in the direction along the longitudinal axis L of the interior component carrier system 10 from the installation rail 12, 14 to the second primary structure component 18b. In the arrangement according to FIGS. 2a and b, each second primary structure component 18b is provided with a second contact face 52 suitable for interaction with a first contact face 50 provided on an associated load transmission element 48.

In a first operational state of the interior component carrier system 10 depicted in FIG. 2a, a gap g is present between each pair of a first and a second contact face 50, 52, in the direction along the longitudinal axis L of the interior component carrier system 10. To the contrary, in a second operational state of the interior component carrier system 10 depicted in FIG. 2b, each pair of a first and a second contact face 50, 52 contacts each other. The interaction between the first and the second contact face 50, 52, in particular in the second operational state of the interior component carrier system 10, ensures an optimum transmission of loads acting in the direction along the longitudinal axis L of the installation rail arrangement from the installation rail 12, 14 to the primary structure components 18b.

In particular, the gap g which is present between each first and second contact face 50, 52 in the first operational state of the interior component carrier system 10 is dimensioned in such a manner that the gap g is eliminated due to a thermally induced repositioning of the primary structure components 18 upon changing the operational state of the interior component carrier system 10 from the first operational state to the second operational state. The first operational state of the interior component carrier system 10 is a ground operational state, i.e., a state wherein an aircraft equipped with the interior component carrier system 10 is operated on the ground. The second operational state of the interior component carrier system 10 is a flight operational state, e.g., a state wherein an aircraft equipped with the interior component carrier system 10 is operated in flight.

In the ground operational state of the interior component carrier system 10, only a limited temperature difference exists between an aircraft environment and an interior of the aircraft. Hence the second primary structure components 18b are arranged at first distances from the first primary structure component 18a which allows the gaps g to be present between the first and the second contact faces 50, 52. To the contrary, in a flight operational state of the interior component carrier system 10, a significant temperature difference exists between an aircraft environment and the interior of the aircraft. Hence the second primary structure components 18b are arranged at second distances from the first primary structure component 18a which are smaller than the first distances between the second primary structure components 18b and the first primary structure component 18a in the first operational state. Thus, since the gap g, i.e., the distance between the first and the second contact faces 50, 52 in the first operational state of the interior component carrier system 10 is adjusted to the thermally induced repositioning, the primary structure components 18 experience upon changing the operational state of the interior component carrier system 10 from a ground operational state to a flight operational state, the gap g between the first and the second contact faces 50, 52 is closed and, in the flight operational state of the interior component carrier system 10, the first and the second contact faces 50, 52 contact each other.

In the configuration shown in FIGS. 4 to 7, the load transmission element 48 comprises a bolt-shaped part 54 extending in a direction substantially parallel to the longitudinal axis L of the interior component carrier system 10 and having a circumferential outer surface 56. The circumferential outer surface 56 includes alternately on a circumferential path in a cross-sectional plane of the bolt-shaped part 54 two ridged sections 60 and two plain sections 62. Each ridged section 16 includes a plurality of ridges 64. The load transmission elements 48 further comprises a stopper portion 66. The first contact face 50 is formed on the stopper portion 66 and extends in a direction substantially perpendicular to the longitudinal axis L of the installation rail arrangement 10. The second contact face 52 that is adapted to interact with the first contact face 50 is formed on the second primary structure element 18b and extends opposite to the first contact face 50 in a direction substantially perpendicular to the longitudinal axis L of the interior component carrier system 10.

In order to be able to interact with the load transmission element 48, the second fastening bolt 36b, in the arrangements according to FIGS. 4 to 7, comprises a tubular part 68 extending in a direction substantially parallel to the longitudinal axis L of the interior component carrier system 10 and having a circumferential inner surface 70. The circumferential inner surface 70 of the tubular part 68 includes alternately on a circumferential path in a cross-sectional plane of the tubular part 68 two ridged sections 72 and two plain sections 74. Each ridged section includes a plurality of ridges 76.

Figure 5:
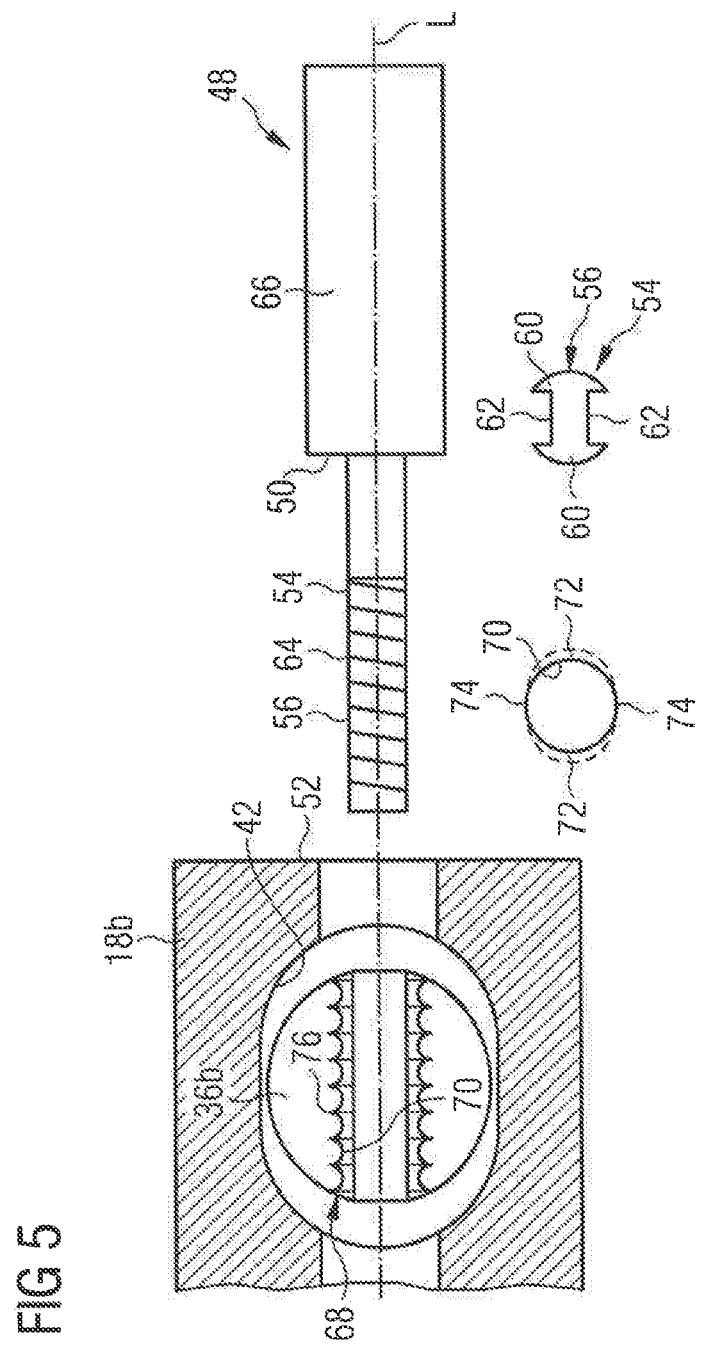
FIGS. 5 to 7 illustrate the installation of the load transmission element depicted in FIG. 4, FIGS. 8 to 11 illustrate the installation of the interior component carrier system according to FIG. 1 in an aircraft.
Figure 6:
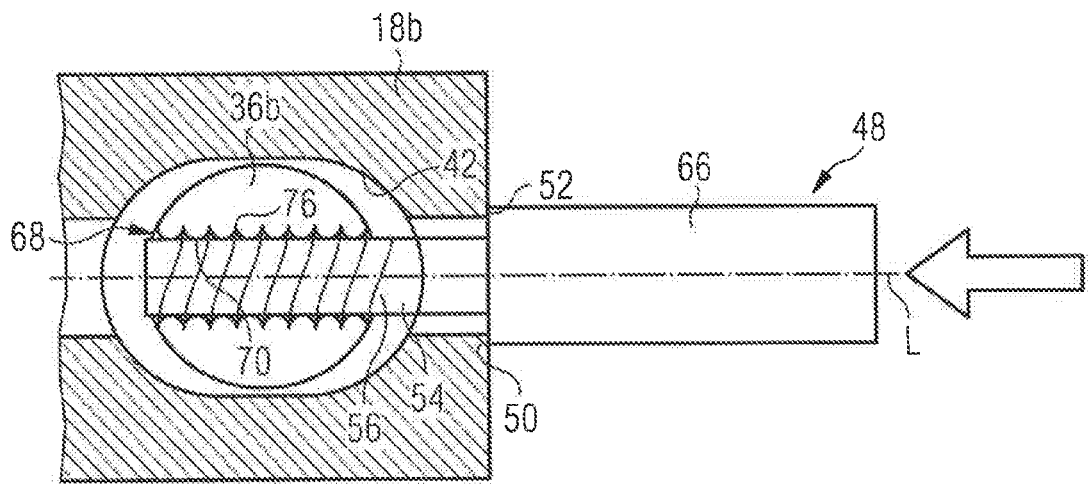

As shown in FIGS. 5 and 6, the bolt-shaped part 54 of the load transmission element 48 is configured to be inserted into the tubular part 68 of the second fastening bolt 36b in a state where a cross-sectional projection of the ridged sections 60 of the bolt-shaped part 54 coincide with a cross-sectional projection of the plain sections of the tubular part 68 until the first and the second contact surface 50, 52 are arranged at a desired distance from each other so as to define the gap g. During insertion of the bolt-shaped part 54 of the load transmission element 48 into the tubular part 68 of the second fastening bolt 36b, the cross-sectional projection of the bolt-shaped part 54 of the load transmission element 48 including the ridged sections 60 does not overlap with a cross-sectional projection of the interior opening of the tubular part 68. Consequently, upon inserting the bolt-shaped part 54 of the load transmission element 48 into the tubular part 68 of the second fastening bolt 36b, the desired distance between the first and the second contact surface 50, 52, i.e., the gap g can easily be adjusted as desired.

Figure 7:
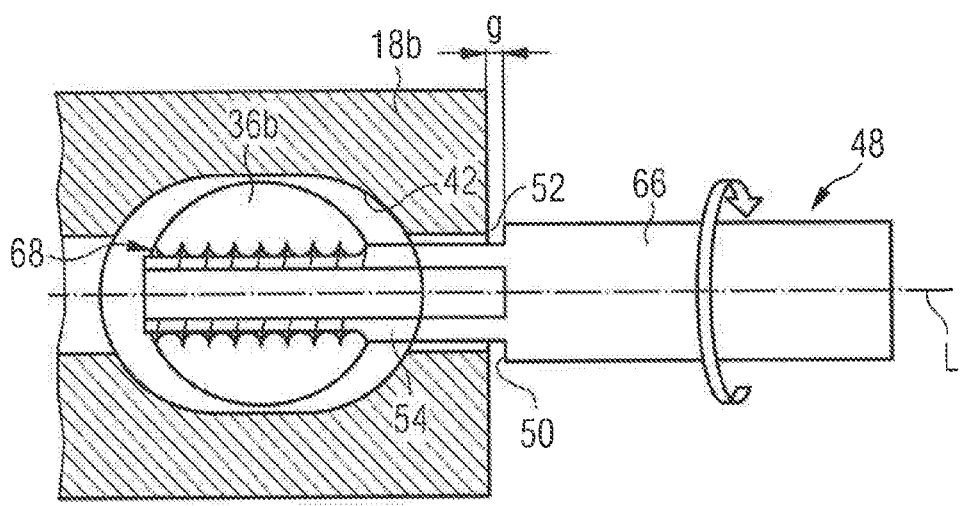

Further, as shown in FIG. 7, the bolt-shaped part 54 of the load transmission element 48 is configured to be rotated relative to the tubular part 68, thereby engaging respective ridges 64, 76 of the bolt-shaped part 54 and the tubular part 68, so as to secure the load transmission element 48 to the second fastening bolt 36b. Upon inserting the bolt-shaped part 54 of the load transmission element 48 into the tubular part 68 of the second fastening bolt 36b, each ridged section 60 of the bolt-shaped part 54 is located in a corresponding plain section 74 of the tubular part 68 and, hence, next to a ridged section 72 of the tubular part 68. When performing a rotation of the bolt-shaped part 54, the ridges 64 of the bolt-shaped part 54 engage with the ridges 76 of the tubular part 68. When engaged, the ridges 64, 76 of the bolt-shaped part 54 and the tubular part 68 affix the bolt-shaped part 54 and the tubular part 68 to one another and, hence, affix the gap g between the first and the second contact surface 50, 52. Finally, a locking element 78 which is adapted to lock the load transmission element 48 against rotation relative to the second fastening bolt 36b is attached, see FIG. 4.

In the arrangement shown in FIGS. 4 to 7, the bolt-shaped part 54 of the load transmission element 48, in a first step, is inserted into the tubular part 68 of the second fastening bolt 36b until the first contact surface 50 abuts against the second contact surface. Thereafter, upon rotating the bolt-shaped part 54 relative to the tubular part 68 in a second step, the first contact surface 50 again is moved away from the second contact surface 52, so as to adjust the gap g as desired. It is, however, also conceivable to provide the bolt-shaped part 54 and the tubular part 68 with ridges 64, 76 which are not have a pitch. The bolt-shaped part 54 of the load transmission element 48, in a first step, then is inserted into the tubular part 68 of the second fastening bolt 36b until the first contact surface 50 is arranged at a desired distance from the second contact surface 52 which defines the gap g. Thereafter, by rotating the bolt-shaped part 54 relative to the tubular part 68 in a second step the bolt-shaped part 54 and the tubular part 68 are affixed relative to each other while maintaining the distance between the first and the second contact surface 50, 52.

As shown in FIG. 1, the interior component carrier system 10 further comprises a first carrier element 80, the first carrier element 80 having a first end and a second end. The first end of the first carrier element 80 is connected to a first carrier rod 82 that extends in a direction along the longitudinal axis L of the interior component carrier system 10 and that is fastened to the carrier portion 20 of the first installation rail 12. In particular, the first carrier rod 82 is fastened to the carrier portion 20 of the first installation rail 12 by a plurality of fasteners 31 each of which is guided through aligned openings 30 formed in the arms 26, 28 of the carrier portion 20 and a corresponding opening formed in the first carrier rod 82. If need be, the connection between the first carrier rod 82 and the carrier portion 20 of the first installation rail 12 may be established with a fixed bearing/floating bearing arrangement, which has been described above in relation to the connection between the connecting portions 16 of the installation rails 12, 14 and the primary structure components 18.

The first carrier element 80 comprises a first portion 80a and a second portion 80b, each being provided with an external thread. The first and the second portion 80a, 80b of the first carrier element 80 are connected to each other by means of a sleeve nut 118 which is provided with an internal thread. Thus, by the interaction of the external threads of the first and the second portion 80a, 80b of the first carrier element 80 with the internal thread of the sleeve nut 118, a length of the first carrier element 80 in a direction along a longitudinal axis of the first carrier element 80 can be adjusted.

The interior component carrier system 10 further comprises a second carrier element 84 which, like the first carrier element 80, also has a first end and a second end. The first end of the second carrier element 84 is connected to a second carrier rod 86. The second end of the second carrier element 84 is connected to the first carrier element 80. The second carrier rod 86 which is connected to the first end of the second carrier element 84 extends in a direction along the longitudinal axis L of the interior component carrier system 10 and is fastened to the carrier portion 20 of the second installation rail 40.

Similar to the first carrier rod 82, also the second carrier rod 86 is fastened to the carrier portion 20 of the second installation rail 14 by a plurality of fasteners 31 each of which is guided through aligned openings 30 formed in the arms 26, 28 of the carrier portion 20 and a corresponding opening formed in the second carrier rod 86. If need be, also the connection between the second carrier rod 86 and the carrier portion 20 of the second installation rail 14 may be established with a fixed bearing/floating bearing arrangement, which has been described above in relation to the connection between the connecting portions 16 of the installation rails 12, 14 and the primary structure components 18.

Like the first carrier element 80, also the second carrier element 84 comprises a first portion 84a and a second portion 84b, each being provided with an external thread. The first and the second portion 84a, 84b of the second carrier element 84 are connected to each other by means of a sleeve nut 120 which is provided with an internal thread. Thus, by the interaction of the external threads of the first and the second portion 84a, 84b of the first carrier element 84 with the internal thread of the sleeve nut 120, a length of the second carrier element 84 in a direction along a longitudinal axis of the second carrier element 84 can be adjusted.

The interior component carrier system 10 further comprises a third carrier element 87. The third carrier element 87 has a first end which is connected to the second carrier element 84 and a second end. The third carrier element 87 extends from the second carrier element 84 substantially parallel to a portion of the first carrier element 80.

As schematically illustrated in FIG. 1, the interior component carrier system 10 is pre-assembled on a mounting jig 88 outside of the aircraft which finally should be equipped with the interior component carrier system 10. Upon mounting the interior component carrier system 10, in a first step, the first and the second installation rails 12, 14 are provided and fastened to the mounting jig 88. In particular, the first and the second installation rails 12, 14 are fastened to the mounting jig 88 by connecting their respective carrier portions 20 to an associated mounting rod 90, 92 provided on the mounting jig 88, see FIG. 8. In particular, the carrier portions 20 of the installation rails 12, 14 are fastened to the mounting roots 90, 92 of the mounting jig 88 by means of fasteners 93 which is guided through respective aligned openings 30 formed in the arms 26, 28 of the carrier portions 20 and a corresponding opening formed in the mounting rods 90, 92.

Thereafter, the first carrier element 80 with the first carrier rod 82 being connected to its first end is connected to the first installation rail 12 by fastening the first carrier rod 82 to the carrier portion 20 of the first installation rail 12 as described above. Similarly, the second carrier element 86 with the second carrier rod 86 being connected to its first end is connected to the second installation rail 14 by fastening the second carrier rod 86 to the carrier portion 20 of the second installation rail 14 as described above. The second end of the second carrier element 84 is connected to the first carrier element 80. The connection between the first and the second carrier element 80, 84 may be established prior to connecting the first and the second carrier element 80, 84 to the first and the second installation rails 12, 14. It is, however, also conceivable to first connect the first and the second carrier element 80, 84 to the first and the second installation rails 12, 14 and only thereafter establish the connection between the first and the second carrier element 80, 84.

The third carrier element 87 is connected to the second carrier element 84 by connecting the first end of the third carrier element 87 to the second carrier element 84. The connection between the second and the third carrier element 84, 87 may be established prior to connecting the second carrier element 84 to the second installation rail 14 and the first carrier element 80. It is, however, also conceivable to first connect the second carrier element 84 to the second installation rail 14 and the first carrier element 80 and only thereafter establish the connection between the second and the third carrier element 84, 87.

Figure 11:
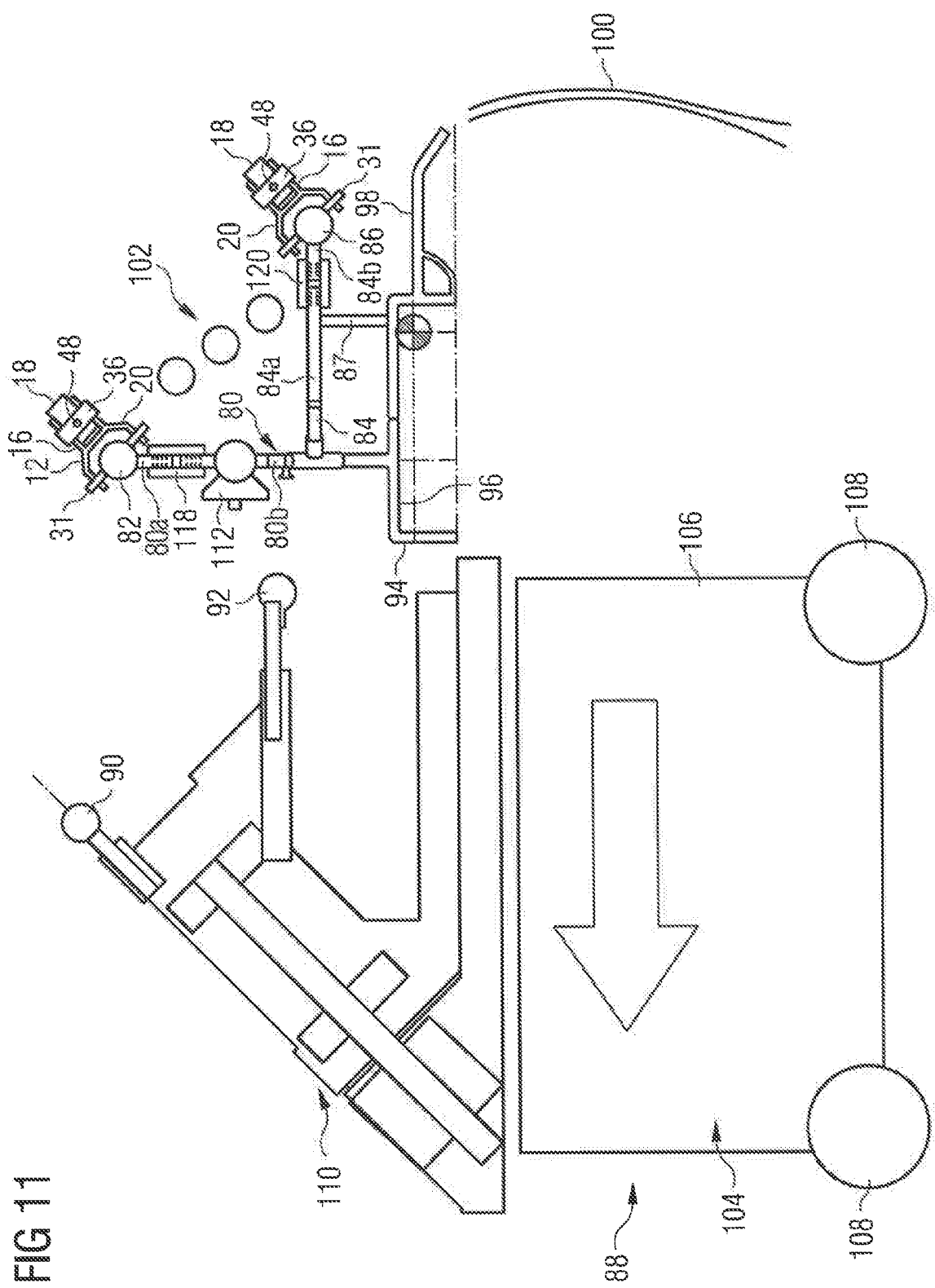

In the interior component carrier system 10, the second carrier element 84 extends substantially perpendicular to the first carrier element 80. When the interior component carrier system 10 is installed in an aircraft as shown in FIGS. 11 to 13, the first and the third carrier element 80, 87 extend substantially parallel to a z-axis of the aircraft, i.e., the axis extending substantially perpendicular to an aircraft cabin floor. The second carrier element 84 extends substantially parallel to a y-axis of the aircraft, i.e., a transverse axis extending substantially parallel to an aircraft cabin floor.

A free second end of the first carrier element 80 is connectable to a first interior component 94. In addition, also a free second end of the third carrier element 87 is connectable to the first interior component 94. In the embodiment of an interior component carrier system 10 shown in the drawings, the first interior component 94 is designed in the form of a cove light panel that extends substantially perpendicular to the first carrier element 80. The first interior component 94 designed in the form of a cove light panel has a first portion 96 and a second portion 98. The first portion 96 is designed in the form of receptacle for receiving personal service components and a lighting element as well as electrical connections for the lighting element. The second portion 98 extends from the first portion 96 and forms a lining element which, when the interior component carrier system 10 and the first interior component 94 are mounted in an aircraft, closes a gap existing in a direction along the y-axis of the aircraft between the first portion 96 of the cove light panel and a sidewall lining element 100, see FIG. 11.

Since the carrier portion 20 of the first and the second installation rails 12, 14 is provided with a row of openings 30, the interior component carrier system 10 can be attached to the first and the second installation rails 12, 14 at any desired location along an x-axis of an aircraft equipped with the interior component carrier system 10. Customizing of an aircraft cabin layout is thus made possible. In particular, the first interior component 94 and other interior components such as galleys, lavatories, etc. can be installed any desired location along an x-axis of an aircraft equipped with the interior component carrier system 10 while loads acting in the direction of the x-axis may be absorbed by an add-on kit for the first and the second installation rails 12, 14. Further, the openings 30 may be used for the attachment of wirings which may be achieved in a simple manner. The attachment of interior components to the installation rails 12, 14 allows a decoupling of the interior components from the primary structure which simplifies customization.

Upon mounting the interior component carrier system 10, an arrangement comprising the first and the second installation rails 12, 14, the first, the second and the third carrier element 80, 84, 87 and the first interior component 94 is pre-assembled while the first and the second installation rails 12, 14 is fastened to the mounting jig 88. In particular, the first interior component 94 is connected to the second ends of the first and the third carrier element 80, 87 while the first and the second installation rails 12, 14 is fastened to the mounting jig 88. In addition, further aircraft interior components such as, for example, wiring and piping 102 for connecting aircraft interior components attached to the interior component carrier system 10 or other aircraft interior components to subordinate supply systems of the aircraft are attached to the interior component carrier system 10 outside the aircraft while the first and the second installation rails 12, 14 is fastened to the mounting jig 88.

Additional aircraft interior components may be attached to the interior component carrier system 10 after installation of the interior component carrier system 10 in an aircraft. The structure and the composition of the assembly defined by the interior component carrier system 10 and any aircraft interior components attached thereto may be customized as desired. For example, a basic version of the interior component carrier system 10 and associated aircraft interior components can be preassembled. This basic version then may be supplemented with additional components according to customization requirements.

Figure 8:
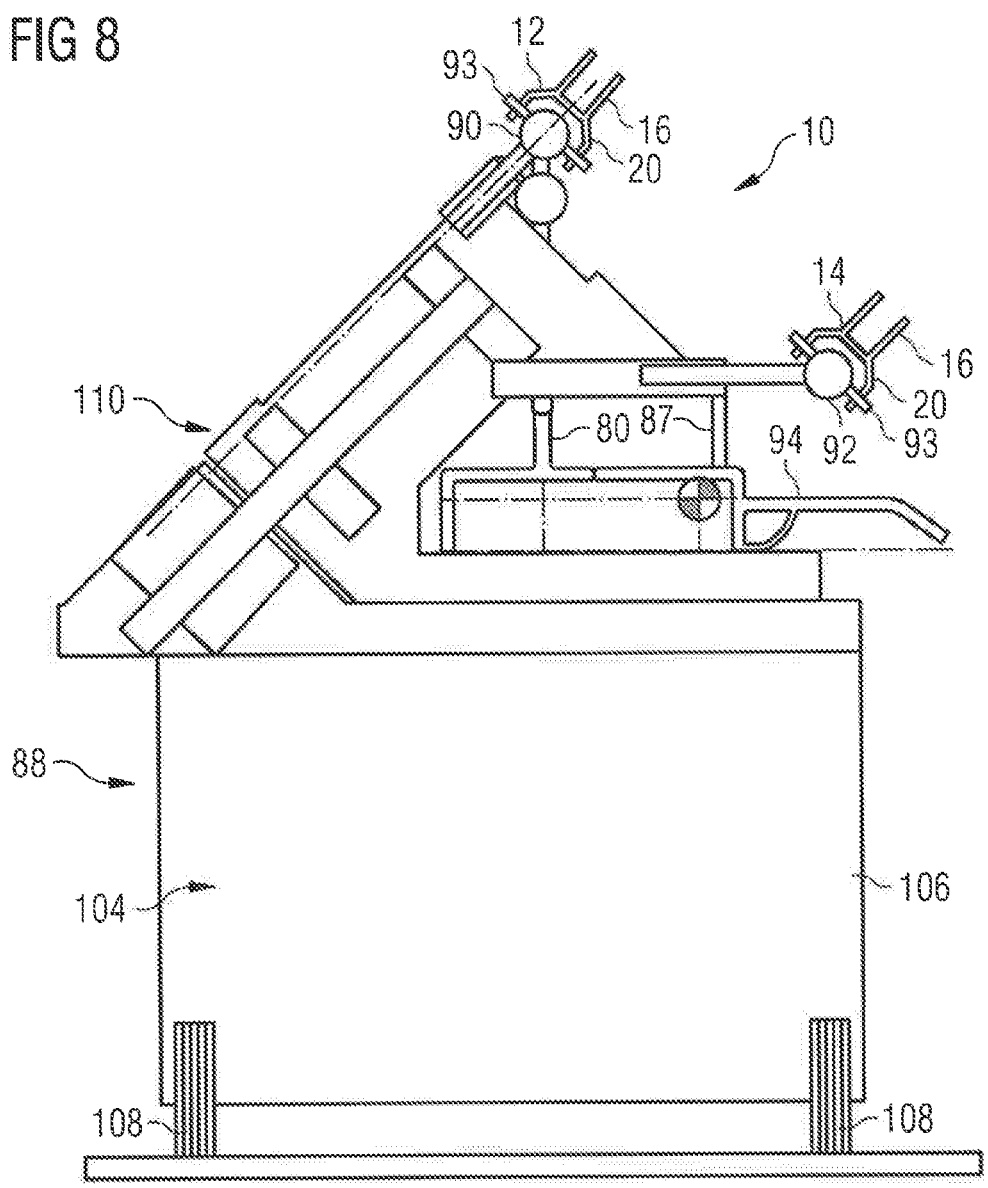
Figure 9:
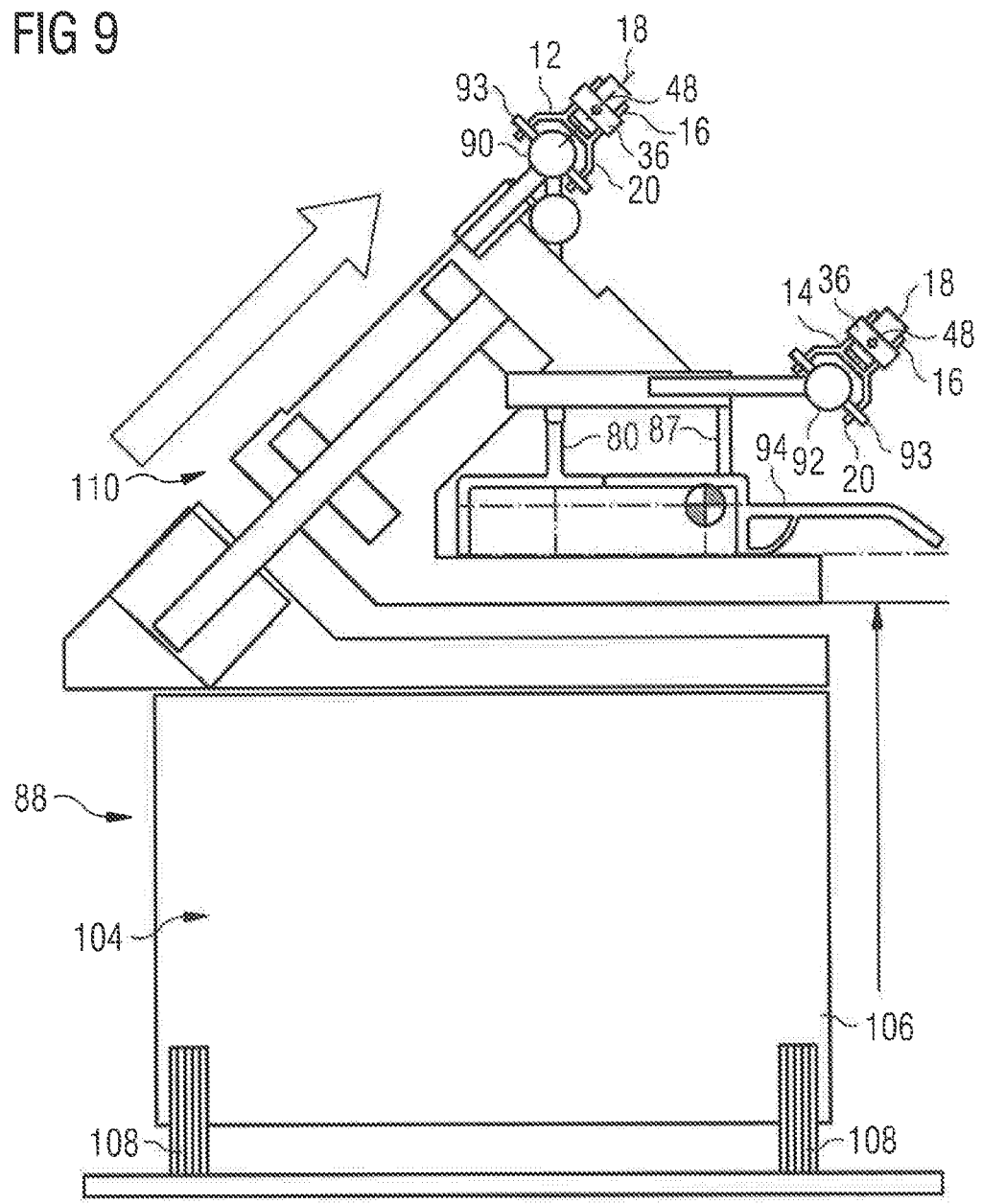

As shown in FIGS. 8 and 9, the pre-assembled arrangement comprising the first and the second installation rails 12, 14, the first and the second carrier rod 82, 86, the first, the second and the third carrier element 80, 84, 87 and the first interior component 94 is transported to its final installation position inside the aircraft by means of a transport unit 104. In the arrangement shown in the drawings, the transport unit 104 forms a part of the mounting jig 88 and comprises a base structure 106 having wheels 108 which allow the mounting jig 88 to be also used for transporting the pre-assembled arrangement to its final installation position inside the aircraft. A transfer from the mounting jig 88 to a separate transport unit thus can be dispensed with.

Figure 10:
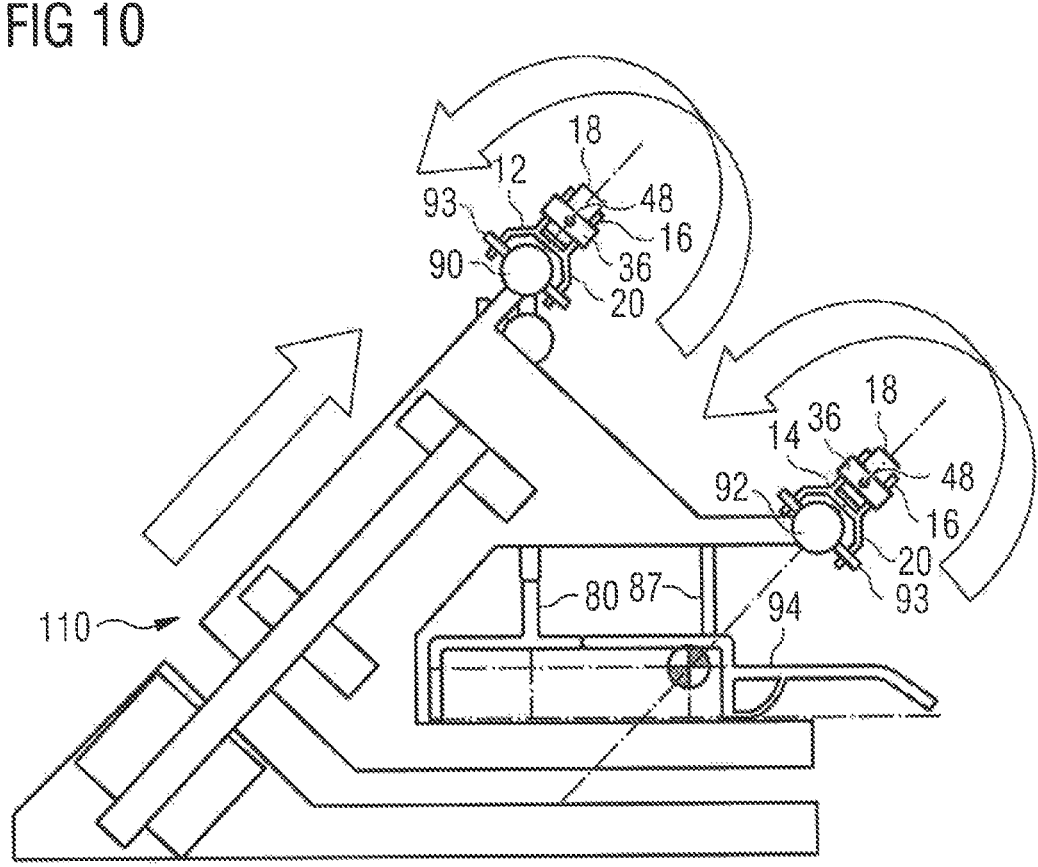

The pre-assembled arrangement comprising the first and the second installation rails 12, 14, the first and the second carrier rod 82, 86, the first, the second and the third carrier element 80, 84, 87 and the first interior component 94 is moved to its final installation position inside the aircraft by means of a lifting device 110. The lifting device 110 comprises a step motor which allows the pre-assembled arrangement to be positioned in its final installation position inside the aircraft. Further, upon positioning the pre-assembled arrangement in its final installation position inside the aircraft, a rotation around the longitudinal axis L of the pre-assembled arrangement is possible, see FIG. 10.

Upon being moved, i.e., lifted to its final installation position, the pre-assembled arrangement comprising the first and the second installation rails 12, 14, the first and the second carrier rod 82, 86, the first and the second carrier element 80, 84 and the first interior component 94 is oriented in such a manner that an edge of the first interior component 94 that extends in a direction along the longitudinal axis L of the interior component carrier system 10 is aligned with a master line M defining a desired position of the edge of the first interior component 94.

If necessary, a length of the first carrier element 80 is adjusted in a direction along a longitudinal axis of the first carrier element 80 by moving the first portion 80a and the second portion 80b of the first carrier element 80 relative to each other in the direction along the longitudinal axis of the first carrier element 80. This may be achieved by the interaction of the external threads of the first and the second portion 80a, 80b of the first carrier element 80 with the external thread of the sleeve nut 118. As a result, the edge of the first interior component 94 may be oriented relative to the master line M in a direction along a z-axis of an aircraft.

Similarly, if necessary, a length of the second carrier element 84 is adjusted in a direction along a longitudinal axis of the second carrier element 84 by moving the first portion 84a and the second portion 84b of the second carrier element 84 relative to each other in the direction along the longitudinal axis of the second carrier element 84. This may be achieved by the interaction of the external threads of the first and the second portion 84a, 84b of the second carrier element 84 with the external thread of the sleeve nut 120. As a result, the edge of the first interior component 94 may be oriented relative to the master line M in a direction along a y-axis of an aircraft.

Finally, the connecting portions 16 of the first and the second installation rails 12, 14 can be attached to the associated primary structure components 18 as described above. In the arrangement shown in the drawings, the lifting device 110 forms a part of the transport unit which in turn forms a part of the mounting jig 88.

The interior component carrier system 10 further comprises an attachment device 112. The attachment device 112 is fastened to the first carrier element 80 and is adapted to be connected to a second interior component 114. In particular, the attachment device 112 is fastened to the first carrier element 80 in such a manner that the attachment device 112 is displaceable relative to the first carrier element 80 in a direction substantially parallel to the z-axis of an aircraft equipped with the interior component carrier system 10. Further, the attachment device 112 is adapted to establish a snap and click connection between the second interior component 114 and the interior component carrier system 10. In the arrangement shown in the drawings, the second interior component 114 is designed in the form of an overhead luggage compartment. The overhead luggage compartment may be designed in the form of a movable bin as shown in FIG. 12 or in the form of a fixed bin as shown in FIG. 13.

The overhead luggage compartment is equipped with a substantially straight back wall 116 which, via the attachment device 112, can be connected to the interior component carrier system 10. Thus, installation space which otherwise is occupied by the overhead luggage compartment, but, due to its shape, not fully usable for receiving luggage items, can be used otherwise, for example for receiving wiring and piping 102.

Upon mounting and installing the interior component carrier system 10 in an aircraft, the second interior component 114 designed in the form of an overhead luggage compartment is connected to the first carrier element 80 via the attachment device 112 after mounting the pre-assembled arrangement comprising the first and the second installation rails 12, 14, the first and the second carrier rod, the first, the second and the third carrier element 80, 84, 87 and the first interior component 94 in its final installation position inside the aircraft. As a result, the overhead luggage compartment can be installed in a comfortable and fast manner. Further, components such as, for example wiring and piping 102 can be mounted in the installation space provided between the overhead luggage compartment and the aircraft's primary structure prior to the installation of the overhead luggage compartment without accessibility restrictions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft interior component carrier system comprising:
a first and a second installation rail, each of the first and the second installation rails including
at least one connecting portion being connectable to an associated primary structure component of the aircraft in order to fasten the installation rail to the primary structure component, and
a carrier portion extending from the at least one connecting portion parallel with a longitudinal axis of the aircraft,
a first carrier element having a first end connected to a first carrier rod extending parallel with the longitudinal axis of the aircraft and a second end which is connectable to a first interior component, wherein the first carrier rod is fastened to the carrier portion of the first installation rail by a plurality of fasteners, each guided through aligned openings formed in the carrier portion, and
a second carrier element having a first end connected to a second carrier rod extending parallel with the longitudinal axis of the aircraft and a second end connected to the first carrier element, wherein the second carrier rod is fastened to the carrier portion of the second installation rail.

2. The system according to claim 1, further comprising an attachment device which is fastened to the first carrier element and which is connectable to a second interior component.

3. The system according to claim 1, wherein the second end of the first carrier element is connectable to the first interior component designed in the form of a cove light panel.

4. The system according to claim 2, wherein the attachment device is connectable to a second interior component designed in the form of an overhead luggage compartment.

5. The system according to claim 1, further comprising a third carrier element having a first end connected to the second carrier element and a second end which is connectable to the first interior component.

6. The system according to claim 1, wherein a length of the first carrier element is adjustable in a direction along a longitudinal axis of the first carrier element, the first carrier element comprising a first portion and a second portion which are connected to each other by means of a sleeve nut.

7. The system according to claim 1, wherein a length of the second carrier element is adjustable in a direction along a longitudinal axis of the second carrier element, the second carrier element in particular comprising a first portion and a second portion which are connected to each other by means of a sleeve nut.

8. The system according to claim 1,
wherein each of the first and the second installation rail comprises one or more additional connecting portions arranged one behind another parallel with the longitudinal axis of the aircraft, each connecting portion being connectable to an associated one of a plurality of primary structure components,
wherein a first connecting portion of the one or more additional connecting portions is configured to interact with an associated first primary structure component in order to define a fixed bearing adapted to connect the first connecting portion and the associated first primary structure component so as to be non-displaceable relative to each other parallel with the longitudinal axis of the aircraft, and
wherein at least one second connecting portion of the one or more additional connecting portions is configured to interact with an associated second primary structure component in order to define a floating bearing adapted to connect the second connecting portion and the associated second primary structure component so as to allow a relative displacement between the second connecting portion and the associated second primary structure component parallel with the longitudinal axis of the aircraft.

9. The system according to claim 8, further comprising a plurality of load transmission elements, each load transmission element being rigidly connectable to one of the first or the second installation rail and a second primary structure component and each load transmission element comprising a first contact face adapted to interact with a complementary second contact face provided on the other one of the first or the second installation rail and the second primary structure component, in order to transfer loads acting parallel with the longitudinal axis of the aircraft from the first or the second installation rail to the second primary structure component, wherein, in a first operational state of the interior component carrier system, a gap is present between the first and the second contact face, parallel with the longitudinal axis of the aircraft, and wherein, in a second operational state of the interior component carrier system, the first and the second contact face contact each other.

10. The system according to claim 9, wherein the gap which is present between the first and the second contact face in the first operational state of the interior component carrier system is dimensioned in such a manner that the gap is eliminated due to a thermally induced repositioning of the second primary structure components upon changing the operational state of the interior component carrier system from the first operational state to the second operational state.

11. A method for mounting an aircraft interior component carrier system, the method comprising the steps of:
   providing a first and a second installation rail, each of the first and the second installation rail including
      at least one connecting portion, and
      a carrier portion extending from the connecting portion in a direction along a longitudinal axis of the aircraft,
   connecting a first carrier element, the first carrier element having a first end connected to a first carrier rod extending in a direction along the longitudinal axis of the aircraft and a second end, to the first installation rail by fastening the first carrier rod to the carrier portion of the first installation rail by a plurality of fasteners, each fastener guided through aligned openings formed in the carrier portion,
   connecting a second carrier element, the second carrier element having a first end connected to a second carrier rod extending in a direction along the longitudinal axis of the aircraft and a second end, to the second installation rail by fastening the second carrier rod to the carrier portion of the second installation rail,
   connecting a first interior component to the second end of the first carrier element,
   connecting the second end of the second carrier element to the first carrier element, and
   connecting the connecting portion of each of the first and the second installation rail to an associated primary structure component of the aircraft.

12. The method according to claim 11, wherein:
   the first and the second installation rails are fastened to a mounting jig arranged remote from an installation site,
   an arrangement comprising the first and the second installation rail, the first and the second carrier rod, the first and the second carrier element and the first interior component is pre-assembled while the first and the second installation rail are fastened to the mounting jig, and
   the pre-assembled arrangement is mounted at its final installation position by connecting the connecting portion of each of the first and the second installation rail to an associated primary structure component.

13. The method according to claim 12, wherein at least one of the first and the second installation rail is fastened to the mounting jig by connecting its respective carrier portion to an associated mounting rod provided on the mounting jig.

14. The method according to claim 12, wherein the pre-assembled arrangement comprising the first and the second installation rail, the first and the second carrier rod, the first and the second carrier element and the first interior component is transported to its final installation position by means of a transport unit, the transport unit in particular forming a part of the mounting jig.

15. The method according to claim 12, wherein the pre-assembled arrangement comprising the first and the second installation rail, the first and the second carrier rod, the first and the second carrier element and the first interior component is moved to its final installation position by means of a lifting device, the lifting device in particular forming a part of the mounting jig.

16. The method according to claim 12, wherein the pre-assembled arrangement comprising the first and the second installation rail, the first and the second carrier rod, the first and the second carrier element and the first interior component, upon being moved to its final installation position, is oriented in such a manner that an edge of the first interior component that extends in a direction along a longitudinal axis of the interior component carrier system is aligned with a master line defining a desired position of the edge of the first interior component.

17. The method according to claim 12, wherein a length of the first carrier element is adjusted in a direction along a longitudinal axis of the first carrier element by moving a first portion and a second portion of the first carrier element, which are connected to each other by means of a sleeve nut, relative to each other in the direction along the longitudinal axis of the first carrier element.

18. The method according to claim 12, wherein a length of the second carrier element is adjusted in a direction along a longitudinal axis of the second carrier element, by moving a first portion and a second portion of the second carrier element, which are connected to each other by means of a sleeve nut, relative to each other in the direction along the longitudinal axis of the second carrier element.

* * * * *